(12) United States Patent
Smith (10) Patent No.: US 8,867,723 B2
(45) Date of Patent: Oct. 21, 2014

(54) METHOD OF RETRIEVING SERVICE INFORMATION

(75) Inventor: Fraser Smith, London (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 13/499,416

(22) PCT Filed: Sep. 9, 2010

(86) PCT No.: PCT/GB2010/001707
§ 371 (c)(1),
(2), (4) Date: Mar. 30, 2012

(87) PCT Pub. No.: WO2011/039497
PCT Pub. Date: Apr. 7, 2011

(65) Prior Publication Data
US 2012/0195412 A1 Aug. 2, 2012

(30) Foreign Application Priority Data
Sep. 30, 2009 (EP) .................................... 09252315

(51) Int. Cl.
*H04M 3/42* (2006.01)
*H04M 3/537* (2006.01)
*H04M 7/00* (2006.01)

(52) U.S. Cl.
CPC ............ *H04M 3/537* (2013.01); *H04M 7/0036* (2013.01); *H04M 7/0009* (2013.01)
USPC ................................. 379/207.02; 379/207.05

(58) Field of Classification Search
USPC ................... 379/67.1, 74, 82, 207.02, 207.05
See application file for complete search history.

(56) References Cited

U.S. PATENT DOCUMENTS

| 5,754,628 A * | 5/1998 | Bossi et al. ................ 379/88.12 |
| 8,214,338 B1 * | 7/2012 | Kirchhoff et al. ............. 707/693 |
| 2002/0114437 A1 * | 8/2002 | Nabkel et al. ............ 379/201.01 |

OTHER PUBLICATIONS

International Search Report for PCT/GB2010/001707, mailed Nov. 30, 2010.

* cited by examiner

*Primary Examiner* — Simon King
(74) *Attorney, Agent, or Firm* — Nixon & Vanderhye, P.C.

(57) ABSTRACT

A method for a communications device (12) to successively querying a remote service platform (32) for service information updates, the method comprising at the device: monitoring a PSTN line for a trigger event associated with a PSTN call; determining if a trigger event has occurred, and if so, establishing a data session with the remote service platform; generating a request for a service information update, the request including a calling line identifier for the PSTN line; and sending the request to the remote service platform.

20 Claims, 6 Drawing Sheets

METHOD OF RETRIEVING SERVICE INFORMATION

This application is the U.S. national phase of International Application No. PCT/GB2010/001707, filed 9 Sep. 2010, which designated the U.S. and claims priority to EP Application No. 09252315.8, filed 30 Sep. 2009, the entire contents of each of which are hereby incorporated by reference.

BACKGROUND

1. Technical Field

The present invention relates to a method of event-triggered service information retrieval. In particular but not exclusively, the invention relates to a method for a device to successively query a voicemail service platform to check for new voicemail messages. The invention retrieves service information including voicemail from a remote server using a device which has been configured to automatically provide authentication information to retrieve such service information without user intervention from the remote server. In particular but not exclusively, the invention relates to a method which configures a device to use a connection-less packet-oriented communications protocol session for a service which requires the provision of credentials such as a password and/or identification of a physical communications line to which the device is attached.

2. Related Art

The Internet Protocol is a connection-less packet-based communications protocol over which a number of telephony services can be provided, for example, VoIP, and also voicemail services. Access to voicemail service information using a conventional telephone device is well known in the art. Voicemail may be stored on the same telephone device or remotely on a server which provides a data storage facility for mail messages for several devices. Voicemail messages are left on a device if it has functionality to retrieve data from a remote storage facility or if the messages are recorded on the device following the device picking up the call. However, a user of a PSTN phone cannot see if a voicemail message is being left as they are speaking to another user, even if they can see that there is another caller waiting to connect to them using a service such as caller waiting. Moreover, a user cannot retrieve a voicemail message stored in association with the calling line identity of a PSTN phone line whilst a device is using the PSTN phone line conventionally as the line is occupied.

In some voicemail services, in order to access voicemail message information, a user needs to log-in and provide authentication information such as a password. This is time-consuming and problematic for the user. A device cannot automatically retrieve information if a user must provide such credentials each time new information is to be retrieved.

U.S. Pat. No. 5,754,628 describes a network-based messaging facility which uses a communications link between the network and a telephone adjunct interface.

The adjunct interface detects and alerts a subscriber to the existence of waiting messages. The interface polls the network after a suitable delay to determine if any messages were left, but if the line is busy, the message is stored at the platform and a selected interval elapses before the subscriber is alerted. It is advantageous, however, for a subscriber to be alerted and to be able to retrieve a message even if the subscriber line is busy. In U.S. Pat. No. 5,754,628, however, the adjunct device only has access to the PSTN line and only makes use of PSTN line characteristics to attempt to determine if voicemails have been deposited.

BRIEF SUMMARY

A first aspect of the invention seeks to provide a method for a communications device connected to a public switched communications network (PSTN) communications line to query a remote service platform (32) for service information updates, the method comprising at the device:

monitoring said PSTN line for a trigger event associated with a PSTN call;

determining if a trigger event has occurred, and if so, establishing a data session with the remote service platform;

generating a request for a service information update, the request including an identifier associable with the service information; and sending the request to the remote service platform using said data session.

Another aspect of the invention seeks to provide a method for a communications device connected to a public switched telephone network (PSTN) communications line having an off-hook condition to query a remote service platform for service information updates, the method comprising at the device:

the device monitoring said PSTN line for a trigger event associated with a PSTN call;

determining if a trigger event has occurred, and if so, establishing' a data session with the remote service platform;

generating a request for a service information update, the request including an identifier associable with said service information; and sending said request to the remote service platform using said data session.

The method may further include said remote service platform processing the request to extract said identifier, and using the identifier to retrieve said service information update.

The trigger event may be determined by the device independently of the presence of any service information being newly retrievable.

The identifier may comprise a line identifier for a PSTN communications line.

The device may monitor said PSTN line when said PSTN line has an off-hook condition for said a trigger event associated with a PSTN call.

The off-hook condition may be caused by said monitoring device or by another device sharing access to the PSTN using said communications line.

The method may further include:

a server receiving said request;

the server processing said request to retrieve said service information update from a data store; and the server sending said service information update to the device.

The identifier may comprise a line identifier such as a calling line identifier used by the device when calling over said communications line to which the communications device is attached.

Alternatively, the identifier may identify a service provided over the communications line.

Alternatively, the PSTN line identifier may be derived from some previously-defined relationship between an identifier for the communications device, or, for example, some other suitable type of preferably globally unique identifier (GUID) and/or a service identifier for the PSTN line communications service.

The line identifier may refer to the identity of the communications line used by the device to retrieve said service information update. A type of data communications protocol may be used which establishes a session with a remote service platform arranged to provide said service information update to the device. The communications protocol may not use the line identifier to establish the session with the service platform. The device sends the line identifier over the session as a form of authentication credential to enable it to access said service information update. The device may repeatedly query the remote service platform. The request may be sent to the remote service platform using said data session.

The device may receive said service information update using said data session whilst said PSTN line has an off-hook state, for example, if said PSTN line to which the device is attached is still occupied with a PSTN telephone call. The service information update may comprises an alert indicating new voice-mail data has been stored on said service. Alternatively, or in addition, said service information update may comprise a new voicemail data message. The method may further comprise retrieving said new voicemail data message from said server.

The device may repeatedly generate requests for service information updates during said PSTN call being monitored.

The termination point of the call being monitored may be the device or it may be another device sharing the same communications line.

The call being monitored may have been generated by the device or by another communications device connected to the same PSTN communications line placing the call or by receiving the call.

The method may further comprise at the remote service platform: processing the request to extract an identifier for the service information update. For example, the service platform may extract an identifier such as a line identifier for the PSTN line for which said service information is associated, or alternatively a device identifier, or user identifier, or other globally unique identifier with which said service information is associable. The method may then further comprise querying if a new service information update associated with the said type of identifier exists, and if so, the service platform sending said service information updates to said device.

The service platform may comprise a voicemail platform arranged to provide access to voicemail left for a PSTN telephone number associated with a line identifier for the PSTN line to which said monitoring device is connected and said service information may then comprise voicemail information.

The service platform may comprise a voicemail platform arranged to provide access to voicemail left for a PSTN telephone number associated with a line identifier for the PSTN line to which said device is connected and said service information may comprises facsimile information.

The service platform comprises a voicemail platform arranged to provide access to voicemail left for a PSTN telephone number associated with said calling line identifier of the PSTN line and wherein said service information comprises short message information.

A trigger event may comprise a telephone call for the device sent over said PSTN line being unanswered by any device within a predetermined period of time.

A trigger event may comprise instead or additionally the PSTN line remaining busy for a predetermined period of time. In addition the trigger event may comprise a PSTN notification of a 'call waiting' or the presentation of incoming ('mid-call') CLI presentation.

If service information is retrieved by the device from the service platform, an alert may be displayed on the monitoring device whilst the PSTN line remains busy.

The alert may comprise a visual indication displayed on the device.

The alert may comprise a sound played by the device.

The device may be configured so that a retrieved voicemail message is playable on the device whilst the device is used for an ongoing telephone communication.

The device may be configured so that the message is audible to selected ones of participants in said ongoing telephone communication.

Another aspect of the invention relates to a method for a communications device to repeatedly query a PSTN voicemail messaging service platform for voicemail updates, the method comprising at the device: monitoring an occupied PSTN line for a trigger event associated with a PSTN call; determining if a trigger event has occurred, and if so, establishing a data session with the remote service platform; generating a request for a service information update, the request including a calling line identifier for the PSTN line; and sending the request to the remote service platform over said data session, whereby a response to said request for said service update is receivable by the device over said data session whilst said PSTN line is still occupied with a PSTN call.

The aspects of the invention are as set out above and by the accompanying independent claims and selected embodiments are as set out by the accompanying dependent claims and description below. The invention may comprise any suitable combination of aspects and selected embodiments apparent to one of ordinary skill in the art.

One or more embodiments of the invention seek to provide a method of activating a device to enable the device to retrieve service information which is uniquely associated with a specific service subscription. The device is configured and activated using unique configuration information so that service information can be retrieved without requiring manual input (e.g. by a user) of data which identifies the specific service subscription and/or manual input of additional authentication data such as a username and/or password. In this way, the configured device is able to automatically retrieve the service information from a remote service platform using a communications system.

The service information is stored in association with a service identifier, which associates the stored data with a specific service subscription. The service identifier may comprise, for example, a user identifier and/or a device identifier, and/or a telephone number identifier such as, for example, a calling line identifier in a wireline network and/or or equivalent wireless network subscription identification information such as a subscriber information module and/or international mobile station equipment identifier. Access to the data identified by the service identification information may require additional authentication information to be provided, either within the initial service request or in subsequent service requests. For example, authentication such as a user identity and password combination may be requested before service information for a particular service subscription is provided.

The embodiments of the invention seek to configure each device uniquely so that a credential data set comprising one or more service identifier(s) and/or authentication information can be automatically provided to a service platform either directly or indirectly to access service information. Some embodiments of the invention seek to provide a method for configuring a device with a unique credential data set which obviates and/or mitigates the need for any manual input of one or more items of credential data required to retrieve data associated with a specific service subscription from a remote server.

Each service platform is capable of providing service information to a large number of devices in the same communications system however each device is configured to retrieve only information for which the respective credentials provide access. The credentials are automatically generated either uniquely by the device and/or by the device in combination with a remote platform, which may comprise the service platform. In this way, a device may access information associated with a service identifier which is either directly represented in the credentials provided by the device in a service request or which is derivable from the credentials in the service request generated by the device by a remote server. This enables a device to retrieve information which is specific to the service identifier from the service platform. In some embodiments where the credential information requires additional information to be provided by a remote server, the remote server may comprise the service platform and/or one or more other servers and/or data store(s) acting in combination. Some specific embodiments of the invention seek to provide a method of, and/or apparatus for, activating a connectionless session-based communications service for a device which requires the device to be associated with a calling line identity in order to receive data associated with the service from a service platform. Selected embodiments of the invention will now be described with reference to the accompanying drawings which are by way of example only and in which:

DETAILED DESCRIPTION OF EXEMPLARY EMBODIMENTS

The best mode of the invention currently known to the inventor is set out below.

Figure 1:
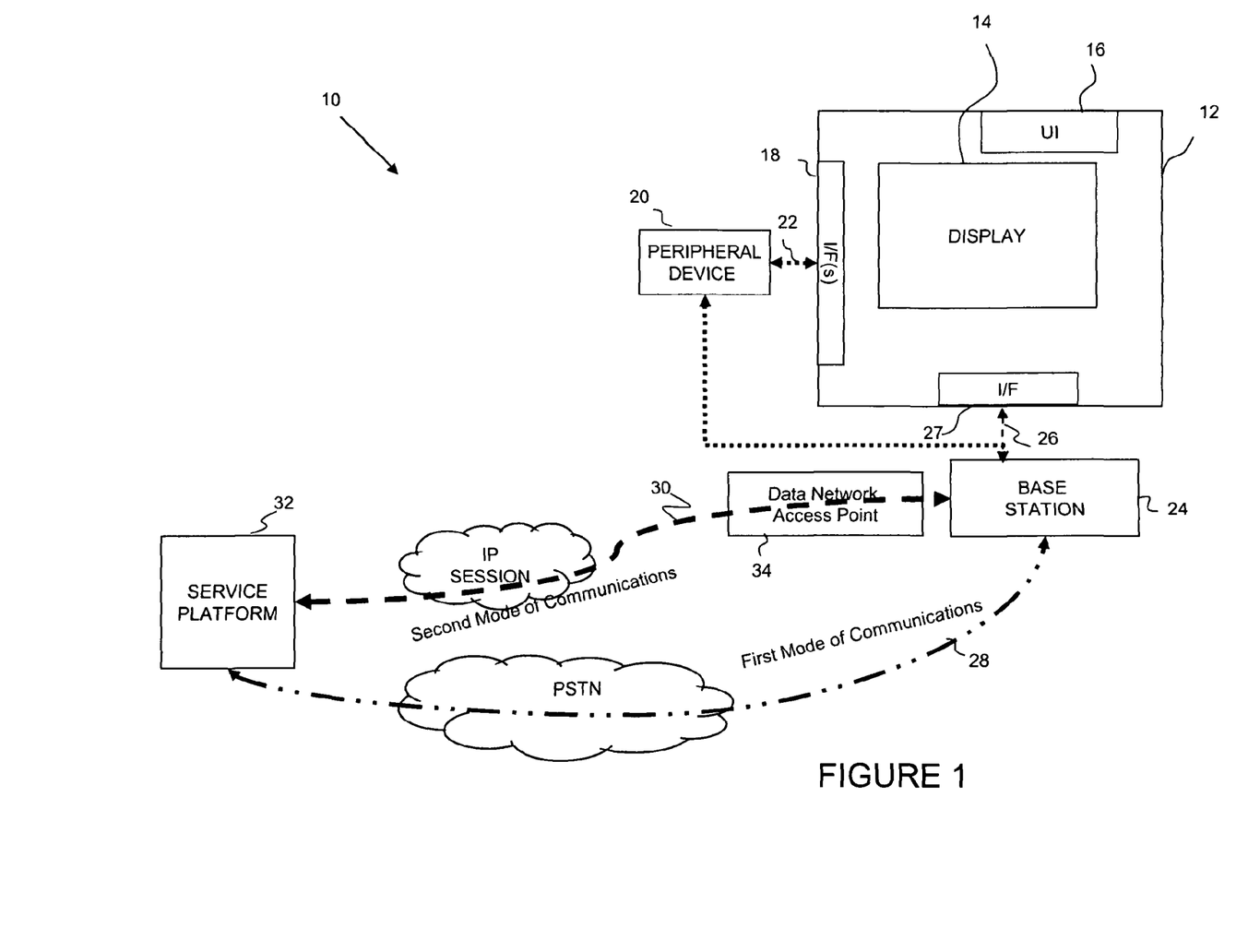
FIG. 1 shows schematically a communications system for providing a service to a device.
Figure 2:
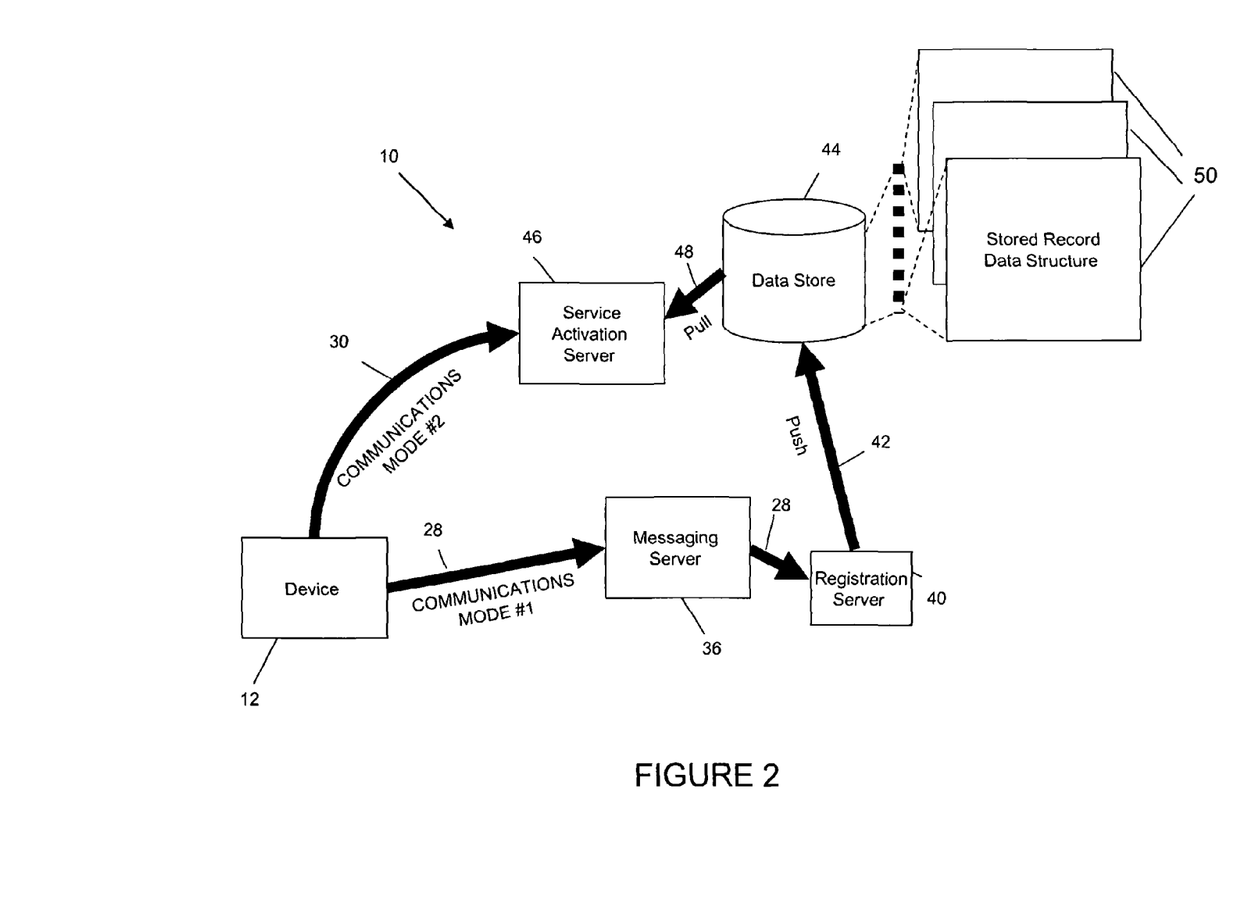
FIG. 2 shows schematically a service activation system for activating a device to provide a service.

FIGS. 1 and 2 relate to various methods of configuring a device for use in a method of accessing service information according to an embodiment of the invention.

FIG. 1 shows a communications system 10 in which a communications device 12 is arranged to access and retrieve service information from a remote service platform 32 by providing appropriate credential information to authenticate a data retrieval request. The service information to be retrieved is uniquely associated with a service identifier, for example, a calling line identifier. An example of a service platform 32 comprises a server offering a voicemail service.

The service platform 32 as shown in FIG. 1 is configured to enable service information to be retrieved using a service request sent using a mode of communication from which the service platform cannot directly retrieve the service identifier. For example, if a request for voicemail is sent to a server using a broadband IP session, the calling line identifier of the communications line would not be apparent from the communications mode used to send the request.

Communications system 10 comprises a plurality of devices 12 located on premises associated with respective communications service subscribers, although only one device 12 is shown in FIG. 1. The device 12 shown in FIG. 1 comprises suitable data processing components (not shown), a display 14 and a user interface 16 which enables a user to control operation of the device and/or provide data input. Device 12 is provided with two modes of communications capability.

Telephone-type functionality, for example, may be provided on device 12 through appropriate transmission and receiving components for connecting to the public switched telephone network (PSTN), means to go on/off-hook, microphone and speaker components and/or device 12 may be provided with a communications-enabled interface 18 for communicating with at least one peripheral device 20, for example, a telephone device, using a suitable communications link 22, for example via a wireless local area connection (WLAN) such as Digital Enhanced Cordless Telecommunications (DECT) such as is shown in FIG. 1.

Device 12 is arranged to communicate over a telephone communications line between the subscriber premises and the local exchange of the PSTN (not shown in FIG. 1) using at least two different modes of communications via a suitable interface 27 which provides connectivity with a separate base-station 24 via a suitable wireless or wired communication link 26. As will be apparent to those of ordinary skill in the art, some or all of the communications functionality of base-station 24 may be integrated into device 12.

In FIG. 1, device 12 uses a first mode of communication 28 which is a conventional public switched telephone network (PSTN) mode of communication. This mode provides the identity of the communications line between the local exchange of the public switched telephone network (PSTN) and the subscriber premises on which the device 12 is located and to which the device 12 is connected to via base station 24. This mode may also be used by other communications devices on the subscriber premises and the calling line identity or CLI will be directly derivable for the communications traffic sent using this mode of communication by any of the devices using the line in this mode of communication.

A second mode of communication 30 uses the same physical communications line as the first but supports traffic send using a connection-less data-packet mode of communication. The second mode of communication therefore does not associate the traffic with the physical line's CLI between the customer premises and the local exchange of the PSTN. This means that the CLI is not directly derivable for communications traffic send using the second mode of communication.

In the communications system shown in FIG. 2, device 12 uses the second mode of communication 30 to establish a data session between the device 12 and a service supporting platform or server 32. The same server 32 also provides an equivalent service over the PSTN using the first mode of communication 28. However, a PSTN service is not supported by the same session-based service platform 32 as the PSTN calling line identity information is not automatically determinable from the communications protocols which are used.

The second mode of communication 30 provides a data communications service, for example an "always on" type of service such as that known as a "broadband service".

Broadband services offer a relatively high-bandwidth connection at least in the direction of the local exchange to the subscriber premises. Such services may use data communications protocols such as the Asynchronous Digital Subscriber Line (ADSL) for example. The second mode of communications may be accessible directly by the device 12 and/or base station 14 or be via a suitable data network access point 34, for example, a router or hub. For example, the access point 34 supports wireless connectivity with the base station 24 and/or device 12 and/or with the server 32, using an appropriate high-bandwidth wireless communications protocol, for example, WiMax and/or WiFi in one embodiment of the invention.

Although in the embodiment shown in FIG. 1, the second mode of communication 30 utilises the same communications line linking the subscriber premises to the local exchange of the public switched telephone network (PSTN) as the first mode of communication 28, in other embodiments it may utilise a wireless connection for at least part of the path taken between the device and the server 32. However, the identity of the telephone line associated with the subscriber premises is only capable of being detected from activity on the line associated with the first mode of communication 28. The second mode of communication uses a data session, for example, and IP session as is shown schematically in FIG. 1. The data session is established and supported using data traffic which is packetised using a protocol such as the Internet Protocol which disassociates the data from a fixed path to its destination. As a result the data traffic sent using the second mode of communication 30 does not automatically contain any information providing a CLI for the physical line to the subscriber premises. As a result, the CLI cannot be automatically determined from a data session, for example an Internet Protocol session, even when running over the same physical line as the first mode of communication 28 uses when using the second mode of communication 30.

As previously mentioned above, in FIG. 1, the device 12 communicates using both the first and second modes of communication via one or more suitable interfaces 27 with base station 24. However, in alternative embodiments of the invention, device 12 incorporates one or more or all of the communications functionality of the base-station 24 directly and if all communications functions are incorporated into the device 12 a separate base-station 24 need not be used or required. Similarly, as would be well known to one or ordinary skill in the art, either or both of the base-station 24 and/or device 12 may also incorporate the communications functionality of a data network access point 34 in some embodiments of the invention.

Service platform 32 provides service information if a device requesting the service information is able to present credentials including an appropriate service identifier. Thus, if the service platform 32 is set up to recognise a calling line identifier as a service identifier, it can retrieve service information comprising voicemail information left for the PSTN number associated with that calling line identifier and thus provide a voicemail service. As shown in FIG. 1, however, device 12 is configured to use the second data communications mode 30 to establish a connection-less packet-based session with a remote service providing platform 32. This mode of communications does not enable the service platform to determine the service identifier from the service request which is needed to access the service data provided by service platform 32. The service identifier is needed as this provides authentication information which is required as the voicemail service is associated with a particular subscriber to the PSTN telephone service identified through the CLI of the communications link between the local exchange to the customer premises associated with that particular subscriber.

The service information (for example, voice messages and/or equivalently any other subscription specific service data, such as video messages, facsimile messages, electronic mail messages or short text messaging messages etc) is stored in association with the service identifier so that the data store for on subscriber can be distinguished from service information stored for other subscribers to the service. As shown in FIG. 1, device 12 uses the second data communications mode to access the service information from the service platform 32 only if the required service identifier can be associated with the request for service information that the device 12 generates. This requires the device 12 to be configured appropriately so that it can generate requests which include credentials which enable the service identifier to be presented to the service platform 32 when the device 12 seeks to retrieve service information. The device may be configured to include the service identifier with any requests it generates for service information or to provide its device identifier in any requests to enable an intermediate server to retrieve a service identifier and/or any other authentication information required and to forward these to the service platform. It is also possible to configure the device to request service and/or authentication information first from a remote server such as the authorisation server and once this information has been received by the device on a per request basis, the device may generate a second request which contains all necessary service identification and authorisation information and this can then be sent directly to the service platform 32.

FIG. 2 of the accompanying drawings shows a device configuration process in which as part of the configuration process, a configuration computer program is run on the device 12. The same numbering system as was used in FIG. 1 is retained for like elements of the invention in FIG. 2.

In FIG. 2 the device runs a configuration computer program which automatically triggers the generation of a first communications message which uniquely identifies the device by incorporating a unique device identifier, for example, its serial number which is addressed to a registration server 40.

The first communications message is then sent out over the communications line via the local exchange using the first mode of communications 28 via a message server 36 to the addressed registration server 40. For example, in one embodiment of the invention, the first communications message comprises a short message service (SMS) text message and message server 36 comprises a PSTN SMS server.

The message server 36 processes the received first message and processes it to extract the forwarding address for the registration service and the CLI of the line used by the first communications mode 28. The message server 36 determines from the registration server address that even if that CLI has not registered for the message service, the message to the registration server should be forwarded. This is advantageous as it means that a user of the service for which the device 12 is to be configured need not have previously registered with the message server 36 for the messaging service over the PSTN.

As shown in FIG. 2, the first communications message then forwarded to a registration server 40 which processes the message to determine the presence of the device identifier and associates this identifier with the service identifier, here the CLI of the communications line used by the first mode of communications via which the first communications message was sent.

The registration server 40 then pushes the service identifier (the CLI) and the device identifier information to a data store 44 to locate and/or update credential data stored on data store 44 to associate the service identified by the CLI with the device identifier and the CLI. For example, a data record 50 may be stored which has a data structure which associates the CLI with the device identity of device 12. In some embodiments of the invention, the data record 50 has a data structure which associates the CLI with one or more entries for device and/or service characteristics, for example, if one or more services are to be provided for a CLI and if so, whether the service has been activated on a particular device identified in the data structure. This enables service identifiers to be associated with the device identifier for a plurality of different service subscriptions and also enables unique configuration information, for example, additional authentication information such as a network generated password or authentication code can be associated with a particular service identifier and/or device identifier.

The data is stored in such a way that a look-up operation can be performed using the device identifier to retrieve the associated credential information, for example, the associated CLI and/or any authentication information such as a passwords etc.

As shown in FIG. 2, the registration server 40 pushes the service identifier (the CLI) and any other information extracted from the SMS such as the device identifier via a communications link 42 to a remote data store 44 however it is not essential for data store 44 and registration server 40 to be remotely located. As would be obvious to one of ordinary skill in the art the data store 44 and registration server 40 may be supported by the same physical platform. The data store 44 is any suitable indexed data storage facility, for example, a database, which is configured to associate a service identifier such as a CLI for a subscriber with a particular device identifier etc. It may also provide a means to store other information in association with a CLI, such as authentication information, as well as information for billing and/or service provision related purposes.

After data store 44 has been updated, the record for a service identifier such as a CLI is associated with a device identity for the device 12. The updating of the record may also generate additional authentication information for the service identified by the service identifier in some embodiments of the invention.

The service for which the device is to be activated requires a service identifier such as a PSTN CLI to retrieve service information. If the messaging service used by device 12 to send the first message to registration server 40 is not real-time or fully reliable, the configuration program script running on the device must delay further execution of certain actions before the configuration process proceeds. For example, the configuration process may wait a predetermined amount of time before continuing with the configuration process.

The configuration process continues with the device generating a second communications message which is sent to service activation server 46 using the second mode of communications 30 to request activation of a service.

Alternatively, however, once the data record 50 has been updated to indicate that the service identifier has been associated with a device identifier and/or with other authentication information, the registration server may generate an acknowledgement message, e.g., an acknowledgment SMS via the first mode of communication. When the device 12 receives the registration acknowledgment, it triggers the initiation of the second mode of communication to establish a data session with the activation server 46.

The data session, for example an Internet Protocol session, may be established earlier, but must be set up with the service activation server 46 so that a second message can be sent either as soon as the acknowledgement is received or a predetermined amount of time after the first message was sent. This second communication message requests activation of the service for the device. The second communication message includes data which at least identifies the device 12 by means of the device identifier. It may also include some means of indicating which type of service is to be activated if the device has been associated with more than one type of service.

The service activation server 46 receiving the second message processes the received message to extract the device identifier and queries the data store to determine the service identifier associated with the device identifier and/or type of service.

The data records 50 of the data store 44 thus have a data structure enabling a data record 50 to be located when the activation server 46 performs a look-up operation or similar index retrieval operation based on at least a device identifier and/or additional information. If the device identifier is determined to be associated with a service-identifier, the activation server 46 amends the data record 50 to indicate that the service is now active for the device and CLI.

The data record 50 for a particular device identifier may also store additional information in association with the device and/or service identifiers, for example, authentication information may be stored and/or other information with which the device 12 may be uniquely configured. This configuration data is retrieved by authentication server 46 in one embodiment of the invention, but may be generated in another embodiment of the invention by the server 46 once it has received confirmation that the service is now active.

In one embodiment where the server 46 generates additional authentication information, it pushes this information to the data store 44 for storage in association with the active record for the device and also pushes the same authentication information in association with the service identifier to the service platform.

In another embodiment, the service platform has pushed the authentication information to the data store for storage in association with the service identifier, and the authentication information is then available to the authentication server 46. The server 46 may retrieve this information from the data store when it receives requests for access to service information from the device by performing a look-up operation. Alternatively, the authentication information is pushed to the device.

Once unique configuration data has been sent to device 12 using the data session supported by the second mode of communication 30, it is used by the continuing configuration process to uniquely configure device 12.

Thus the device 12, after the configuration data has been downloaded from the service activation server 46, is able to complete the configuration process. The configuration information downloaded enables the device to generate requests for one or more service that the device was found to be associated with in the data store 12.

Figure 3A:
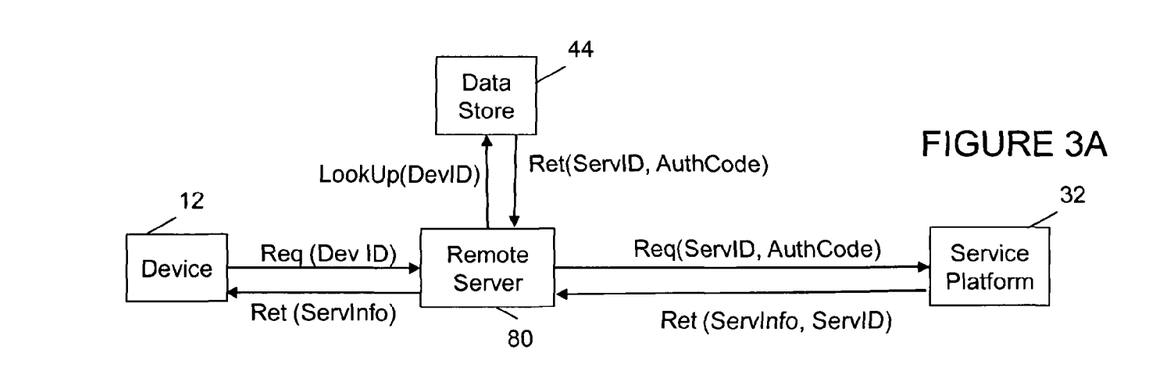
FIGS. 3A to 3D show methods of accessing service information.
Figure 3B:
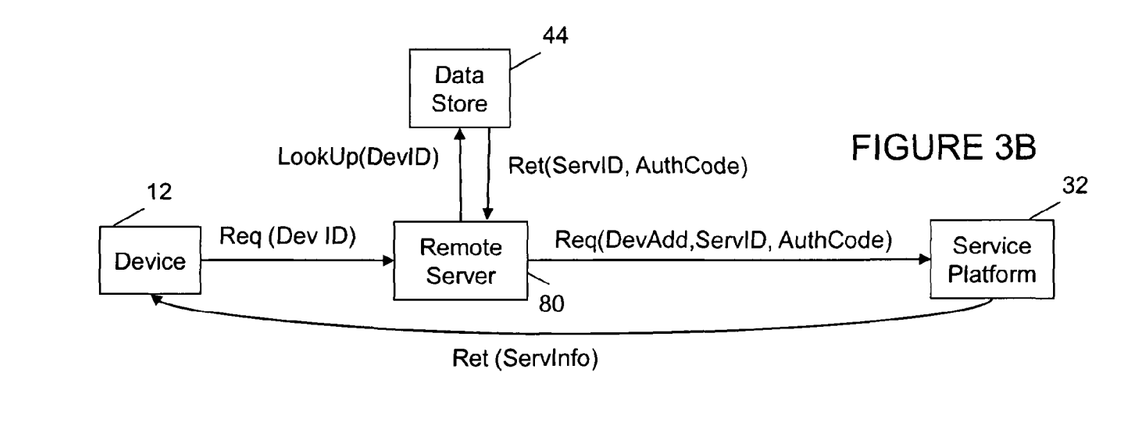
Figures 3C, 3D:
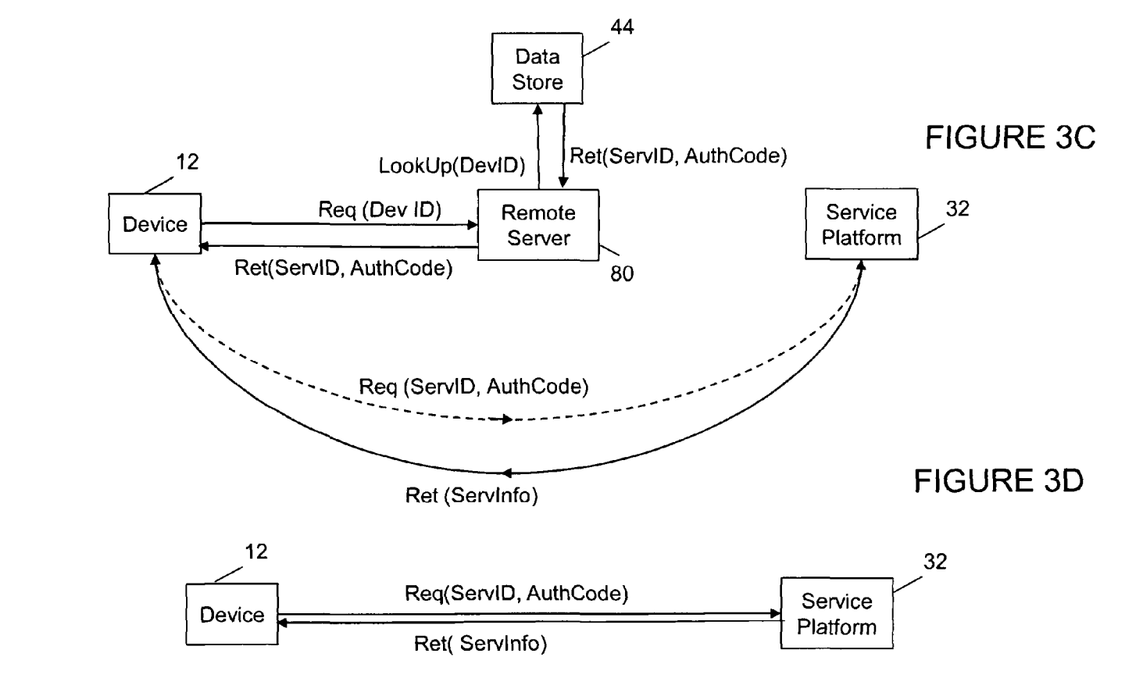

FIGS. 3A to 3C show various methods of accessing service information via a service platform 32 according to one embodiment of the invention in which device 12 is configured to generate a request which includes a device identifier in a request for access to service information which is sent a remote server 80. The server 80 then performs a look-up operation to retrieve a service identifier and authorisation code.

In FIG. 3A the server 80 then either generates a second request or modifies the first request received in order to send a request for service information to the service platform 32 which includes a service identifier and authentication information, for example, a password or similar authentication code. The service platform 32 processes the request to determine if the authentication information received in the request corresponds with the information it has for the account associated with that service identifier, and if so, determines if any service information, e.g. voicemail messages or the like, exists for that account. If service information does exist, the service platform sends the service information back to the remote server 80, which then forwards it to the device 12.

FIG. 3B shows an alternative embodiment which is similar to that shown in FIG. 3A. In FIG. 3B, after performing the lookup operation to determine the authentication information, the remote server 80 sends sufficient information in the request for service information to the service platform 32 to enable the service platform 32 to respond directly to the device 12 if the request is authenticated and service information exists which is to be forwarded to the device 12.

FIG. 3C shows another alternative embodiment. In FIG. 3C, the device sends a request including a device identifier to the remote server 80. The remote server 80 then performs a lookup operation to determine a service identifier and/or authentication information and the remote server 80 then responds to the device 12 by returning the authentication information and service identifier to the device 12. This information enables the device 12 to generate a second request for service information containing the relevant authentication information and service identifier which is then sent directly to the service platform 12.

FIG. 3D show an embodiment in which the device 12 was uniquely configured during the configuration process to generate requests which include the service identifier and authentication information. This enables the device 12 to generate requests automatically for service information which can be processed by the service platform 32 without requiring any intermediate proxy server lookup operations. The service platform 32 responds directly to the device 12.

Figures 4A, 4B:
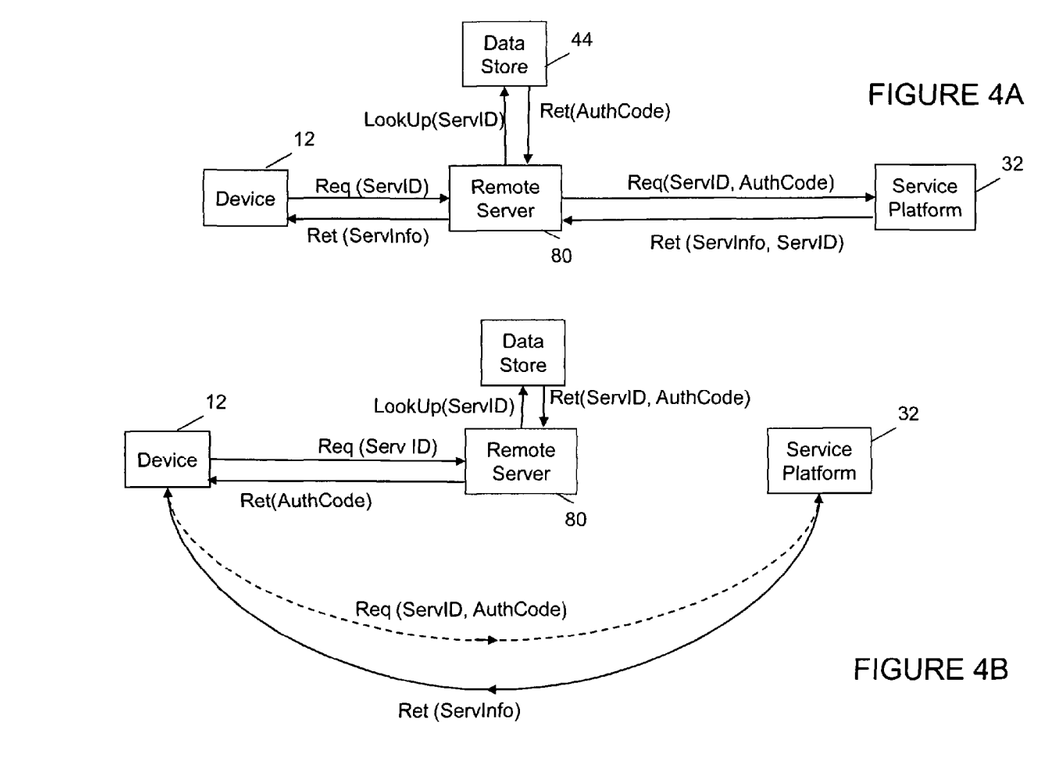
FIGS. 4A and 4B show other methods of accessing service information according to other embodiments of the invention.

FIG. 4A shows an alternative embodiment of the invention, in which the device 12 was configured to automatically include the service identifier with requests to access service information, but for which an additional authentication code is retrieved by proxy server 80. The proxy server 80 then forwards the authentication code with the service identifier to the service platform 32, which responds via the remote server.

FIG. 4B shows another embodiment in which the device 12 is configured to send a service identifier to a proxy server to obtain additional authentication information to access service information. The proxy server 80 sends the authentication information to the device, which then includes the service identifier and the authentication information in a request to access service information which is sent to the service platform 32. The service platform 32 then verifies the request by confirming if an account exists which has the same service identifier and authentication information and if the request is verified, if any service information exists for that account sends the service information to the device 12.

Those of ordinary skill in the art will find it apparent that after service information has been provided by the service platform 32 to the device 12, it may be deleted on the server or it may stay on the server. The service information retrieved by the device 12 from the service platform 32 may comprise only new service information not previously retrieved by the device.

Those of ordinary skill in the art will be aware that many other combinations of service information, device information, and authentication information may be included in requests generated by the device 12 and/or proxy server 80 depending on the way the device 12 and proxy server 80 have been configured to implement the service.

The requests for service information are sent using a data session established between the device 12 and the proxy server 80 or service platform 32 to enable the service information data to be downloaded automatically by the device 12.

The device 12 displays an indication in a preferred embodiment of the invention whenever additional service information has been downloaded.

As the device is configured to use a remote server to obtain authentication information comprising at least authentication information in addition to a service identifier, a greater level of security can be provided as the authentication information is generated within the network. The level of security can be improved if the authentication information is not stored on the device 12. The service identifier may be provided by the device or retrieved in association with the authentication information. In embodiments where the device is not provided with any authentication information, a higher level of security can be provided than might otherwise exist if the authentication information is downloaded to the device. It is also possible, when the authentication information is retrieved by the remote server each time access to information is requested by the device, for the authentication information to be generated using a one-time password technique, i.e., for it to have a limited lifetime or be otherwise synchronised to match a password which would beheld by the service platform in association with the service identifier.

In embodiments of the invention in which the service platform 32 establishes a session directly with the device 12 to provide service information, such as those shown in FIGS. 3C and 4A, the device 12 may need to have its firewall or equivalent security features suitably configured. The information required to configure the device to enable this is provided as part of the configuration information downloaded during the configuration process but as those of ordinary skill in the art will be aware, any suitable mechanism which configures the firewall may be employed instead.

Figure 5:
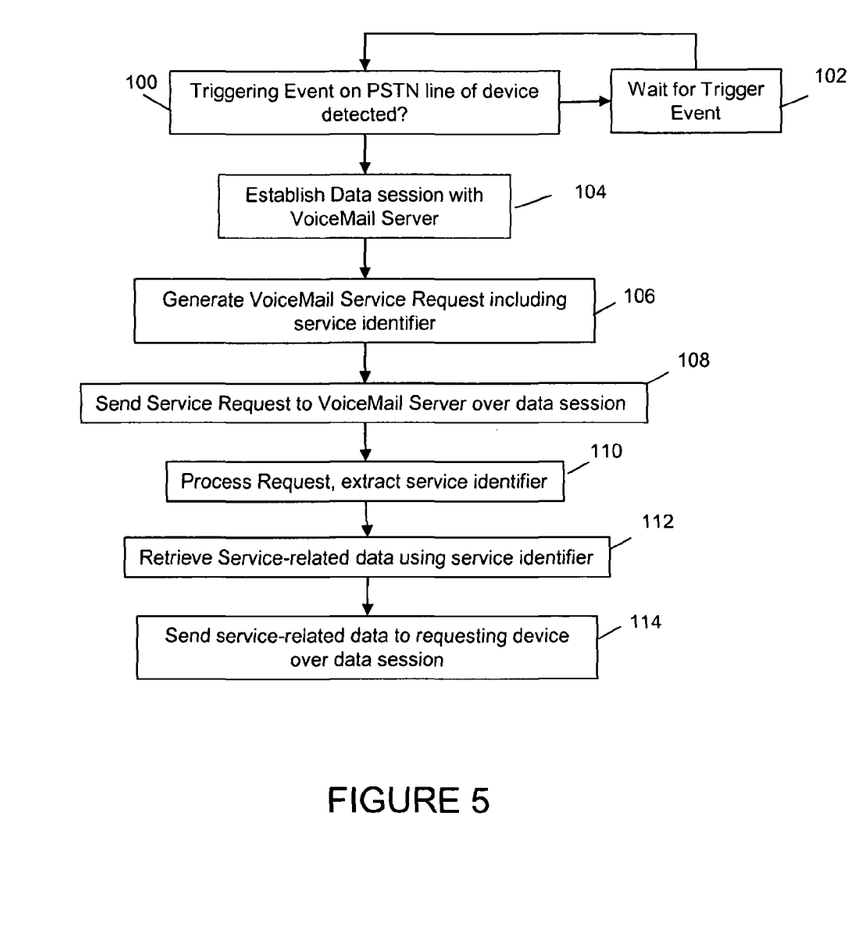
FIG. 5 shows a method of determining when to access voicemail information according to an embodiment of the invention.

FIG. 5 of the accompanying drawings shows a method of event-triggered service information retrieval according to an embodiment of the invention.

As the device 12 uses a data session to retrieve voicemail information, it is not automatically notified when a voicemail message has been left but must poll the voicemail server (service platform 32 in FIG. 1) to see if service information has changed and if so, to retrieve this information to generate an alert.

As within the communications system several thousand or more devices 12 may be deployed which will need to perform a message check from time to time, it is useful if the devices are configured so that they do not all perform a polling request at the same time as this would cause an overload on the access interface to the voicemail server 32. However, as the users of the devices 12 will want to know on as short as possible a timescale after a voicemail message has been left for them on the voicemail server, it is obviously desirous if the devices 12 poll the voicemail server to request message updates as frequently as possible.

In FIG. 5, the device is configured to regard certain events as triggers for generating requests for service information in accordance with one of the previously described methods of accessing service information in which the device is automatically authenticated. The service information includes voicemail messages which have been left on the PSTN communications line to which the device 12 is attached. The method enables a user of the device 12 to receive service information from a service platform 32 even whilst the PSTN communications line is still busy as the service information is retrieved using a session established using a different mode of communications.

In one embodiment, the device 12 is capable of using the PSTN line for PSTN communications services such as an ongoing telephone call and can simultaneously whilst the call is ongoing retrieve voicemail left for the PSTN telephone number using the broadband session. It is also possible for the device to retrieve information about voicemail messages as they are being left and to provide an indication of the service information to the user whilst the PSTN line is still occupied. In this way, a user can see who has or is leaving a voicemail message whilst they are participating in a telephone call.

In the embodiment of a method of accessing voicemail information shown in FIG. 5, the device 12 determines if a triggering event has occurred on the PSTN line (100). Examples of triggering events include:
i) a call signalling on the PSTN line indicating an incoming call has not been picked-up;
ii) call signalling on the PSTN line indicating the PSTN line has been busy for a predetermined period of time.
iii) in-call ('mid-call') signalling on the PSTN line indicating a secondary/waiting call.

If no trigger event is detected, the device 12 continues to monitor the PSTN line (step 102). If a trigger event is detected on the PSTN line, the device 12 establishes a data session with the voicemail server 32 (step 104). A voicemail request message is then generated (104) which includes service identifiers such as the CLI of the PSTN line for which voicemail may have been left (106). The request is sent to the voicemail server 32 to present a service identifier and (optionally) any necessary additional authentication information (steps 108). The voicemail server 32 then processes the request to extract the relevant service identifier and any additional authentication information (step 110), and determines if any service-related data exists for forwarding to the device which is associated with the service identifier the device has provided (step 112). If additional service-related data has been provided then the voicemail platform sends this to the device (step 114).

The method of accessing the invention may use any suitable method, for example, one of the methods previously described in association with FIGS. 3A to 3D and 4A and 4B, depending on how the device 12 has been configured to access the service using the data session (for example, see FIGS. 1 and 2).

The communications line to which the device is attached may be in an off-hook condition whilst performing one or more steps in a method of retrieving service information updates according to the various embodiments of the invention, resulting either from the communications device occupying the line, by being used to place or receive a communications call or facsimile transmission etc., or if another device sharing the same communications line is similarly occupying the line. For example, the device may determine that the line is occupied (i.e., in an off-hook state) when requesting a service information update (e.g. voicemail) and/or the line may be occupied when the service information update (e.g. voicemail) is retrieved.

It is possible for the device to store the voicemail message and generate an audible or visual alert to a user so that they can be aware a new voicemail message has been left. This alert may be generated whilst the user is busy on a PSTN telephone call, and if so, the user can optionally replay the message on the device whilst the PSTN telephone call is ongoing. Whilst the replay may be over a loudspeaker located on the device, it is possible for the message to be played back over the ongoing telephone communication or over other telephone communications if the device is suitable configured. If the device 12 is appropriately configured and the user has subscribed to a multiparty calling service, it is possible for the user to select which participants in a telephone communication are able to hear the message being played.

Those of ordinary skill in the art will be aware of modifications, variations, and functional equivalents to features of the embodiments described herein and the scope of the invention is not to be limited by the specific embodiments described herein above but instead should be determined by the accompanying claims.

What is claimed is:

1. A method for a communications device connected to an occupied PSTN communications line, wherein the PSTN communications line is occupied with a PSTN call, to query a remote service platform for service information updates, the method comprising at the device:
the device monitoring said occupied PSTN line for a trigger event associated with said PSTN call;
determining if a said trigger event has occurred, and if so, establishing a data session with the remote service platform;
generating a request for a service information update, the request including a calling line identifier for the PSTN line; and
sending the request to the remote service platform using said data session.

2. A method as claimed in claim 1, further comprising:
the device receiving said service information update using said data session whilst said PSTN line is still occupied with said PSTN call.

3. A method as claimed in claim 1, wherein said device repeatedly generates requests for service information updates during a said PSTN call.

4. A method as claimed in claim 1, wherein the call being monitored is terminated at the device.

5. A method as claimed in claim 1, wherein the call being monitored is terminated at another communications device connected to the same PSTN communications line.

6. A method as claimed in claim 1, further comprising at the remote service platform:
processing the request to extract the calling line identifier;
querying if service information updates associated with the calling line identifier exist, and if so,
sending said service information updates to said device.

7. A method as claimed in claim 1, wherein said service platform comprises a voicemail platform arranged to provide access to voicemail left for a PSTN telephone number associated with said calling line identifier of the PSTN line and wherein said service information comprises voicemail information.

8. A method as claimed in claim 1, wherein said service platform comprises a voicemail platform arranged to provide access to voicemail left for a PSTN telephone number associated with said calling line identifier of the PSTN line and wherein said service information comprises facsimile information.

9. A method as claimed in claim 1, wherein said service platform comprises a voicemail platform arranged to provide access to voicemail left for a PSTN telephone number associated with said calling line identifier of the PSTN line and wherein said service information comprises short message information.

10. A method as claimed in claim 1, wherein the trigger event comprises a telephone call for the device sent over said PSTN line being unanswered by any device within a predetermined period of time.

11. A method as claimed in claim 1, wherein the trigger event comprises the PSTN line remaining occupied for a predetermined period of time.

12. A method as claimed in claim 11, wherein if service information is retrieved by the device from the service platform, an alert is provided by the device whilst the PSTN line remains occupied.

13. A method as claimed in claim 12, wherein the alert comprises a visual indication displayed on the device.

14. A method as claimed in claim 12, wherein the alert comprises a sound played by the device.

15. A method as claimed in claim 9, wherein the device is configured so that a retrieved voicemail message is playable on the device whilst the device is used for an ongoing telephone communication.

16. A method as claimed in claim 15, wherein the device is configured so that the voicemail message is audible to selected ones of participants in said ongoing telephone communication.

17. A method for a communications device to repeatedly query a PSTN voicemail messaging service platform for voicemail updates, the method comprising at the device:
    monitoring, via a detector device, an occupied PSTN line for a trigger event associated with a PSTN call;
    determining if said trigger event has occurred, and if so,
    establishing a data session with the remote service platform;
    generating a request for a service information update, the request including a calling line identifier for the PSTN line; and
    sending the request to the remote service platform over said data session, whereby a response to said request for said service update is receivable by the device over said data session whilst said PSTN line is still occupied with a PSTN call.

18. A communications device connectable to a communications line occupied with a call, the communications device arranged to query a remote service platform over the communications line by including a service identifier in a request for a service information update associated with said service identifier, the communication device comprising:
    a detector for monitoring the communications line for a trigger event associated with said call;
    a computer processor configured at least to:
        determine whether a trigger event has occurred;
        if said trigger event has occurred, cause said communications device to establish a data session with the remote service platform over said communications line; and
        generate a request for service information update, the request including an identifier for the communications line;
    a transmitter configured to send the request to the remote service platform using said data session; and
    a receiver configured to receive said service information update over said data session while said communications line is still occupied with said call.

19. The communications device according to claim 18, wherein
    the communications line comprises a public switched telephone network (PSTN) communications line.

20. The communications device according to claim 19, wherein
    said service information update comprises a new voice mail remotely stored in said network in association with an identifier for said PSTN communications line.

* * * * *